No. 698,569. Patented Apr. 29, 1902.
F. J. SLEEZER.
CREAMING CAN.
(Application filed June 17, 1901.)
(No Model.)

WITNESSES
Walter Allen
A. G. Heyfmun

INVENTOR
Flavius J. Sleezer.
by Herbert W. T. Jenner.
Attorney

UNITED STATES PATENT OFFICE.

FLAVIUS J. SLEEZER, OF NEWARK, ILLINOIS.

CREAMING-CAN.

SPECIFICATION forming part of Letters Patent No. 698,569, dated April 29, 1902.

Application filed June 17, 1901. Serial No. 64,828. (No model.)

*To all whom it may concern:*

Be it known that I, FLAVIUS J. SLEEZER, a citizen of the United States, residing at Newark, in the county of Kendall and State of Illinois, have invented certain new and useful Improvements in Creaming-Cans; and I do hereby declare the following to be a full, clear, and exact description of the invention, such as will enable others skilled in the art to which it appertains to make and use the same.

This invention relates to creaming-cans having central vertical tubes; and it consists in the novel construction and combination of the parts hereinafter fully described and claimed.

Figure 1:
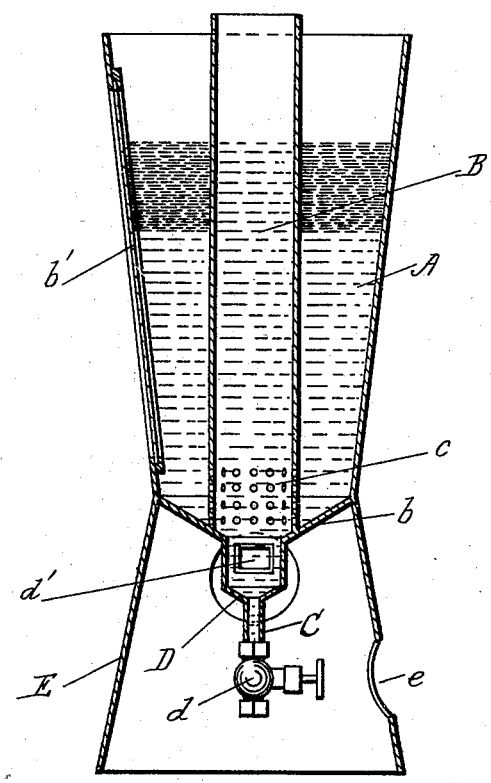
Figure 2:
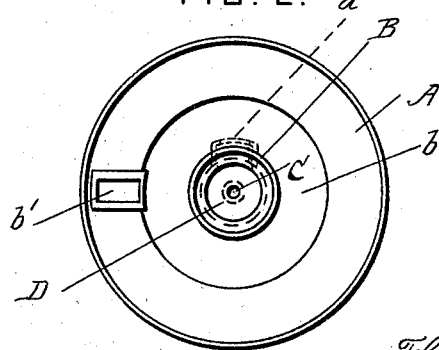

In the drawings, Figure 1 is a vertical section through the can. Fig. 2 is a plan view of the can.

A is a conical can provided with a bottom $b$ at its smaller end and a sight-window $b'$, of transparent material, at one side.

B is a central vertical tube which is provided with a number of very small holes $c$ around its lower part close above the bottom $b$. The central vertical tube or inner vessel B is of about one-third the mean diameter of the outer vessel or can A, so as to provide a large area of cooling-surface. This inner vessel B projects upwardly from the bottom $b$, and it is straight for its full length. A cup D, of smaller diameter than the tube B, depends from the bottom $b$ directly under the said tube or inner vessel B, and this cup D is provided with a transparent sight-window $d'$. C is a short outlet-pipe, which depends from the bottom of the cup D and which is provided with a faucet $d$ of approved construction.

E is a base portion which supports the can A, and $e$ is a hand-hole in the base, through which access can be had to the faucet $d$.

Warm milk as it comes from the cow is poured into the central tube B and rises in the can A, after passing through the holes $c$, until the can A is about one-half full of warm milk. Cold water is then poured gently into the tube B and mixes with the milk in the tube, but does not mix with the milk in the can A because of the smallness of the holes $c$ and the difference in specific gravity of the cold watered milk introduced gently through the small holes $c$ into the lower part of the can A and the pure warm milk in the upper part of the can. The watered milk, and subsequently the pure water, pass through the holes $c$ and raise the milk in the can A. The warm milk is rapidly cooled by the water under it and by the water in the tube B, and the cream separates very rapidly and rises to the top of the milk in the can A. The strata of cream and watered milk can be observed through the window $b'$. At the proper time the faucet is opened and the water and the watered milk are allowed to flow out until the cream begins to show at the window $d'$. The faucet is then closed, and a suitable vessel is placed under it to receive the cream. The faucet is then reopened and the cream is allowed to flow by gravity through the holes $c$ and out of the faucet $d$ into the vessel provided for it.

The cooling vessel or tube B can be filled with lumps of ice before the water is poured into it, and the ice is supported by the annular portion of the bottom $b$ inside the vessel B, so that it does not descend into the cup and obstruct the sight-window.

What I claim is—

1. In a creaming-can, the combination, with an outer vessel provided with a bottom, of a cup depending from the bottom and provided with a sight-window, a faucet suspended from the bottom of the cup, and a cylindrical inner cooling vessel secured to the said bottom over the cup and provided with small holes in its side wall adjacent to the said bottom, substantially as set forth.

2. In a creaming-can, the combination, with an outer vessel provided with a bottom, of a cylindrical cup depending from the bottom and provided with a sight-window, a faucet suspended from the bottom of the cup, and a straight cylindrical inner cooling vessel of larger diameter than the said cup, said inner vessel being permanently secured to the said bottom around and over the cup and provided with small holes in its vertical side wall adjacent to the said bottom, substantially as set forth.

In testimony whereof I affix my signature in presence of two witnesses.

FLAVIUS J. SLEEZER.

Witnesses:
PETER OSMOND,
J. S. JOHNSON.